Dec. 5, 1950  E. T. BOTH  2,532,693
ODDS COMPUTING MEANS FOR RACE TOTALISATORS
Filed Sept. 9, 1948
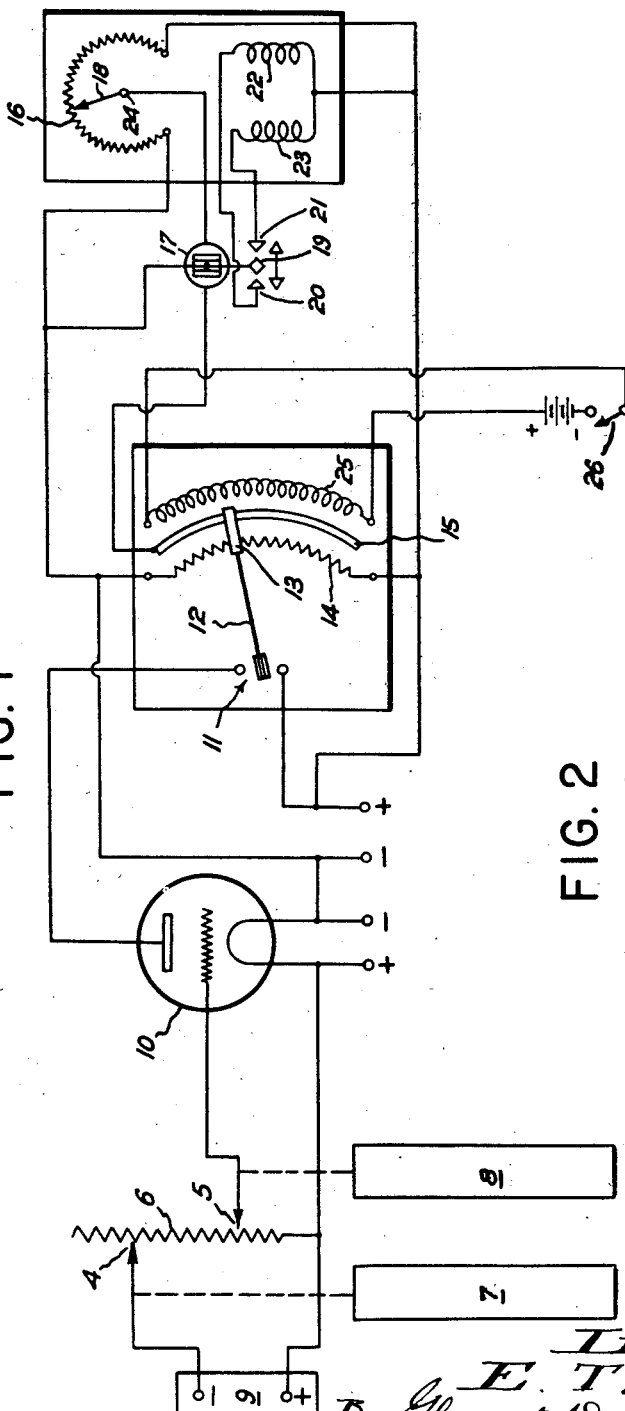
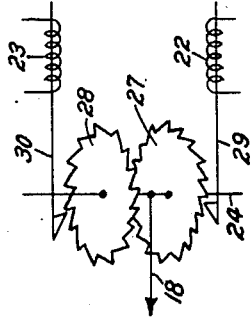
FIG. 2
Inventor
E. T. Both
By Glascock Downing & Seebold
Attys Patented Dec. 5, 1950

2,532,693

UNITED STATES PATENT OFFICE 2,532,693

ODDS COMPUTING MEANS FOR RACE TOTALIZATORS

Edward Thomas Both, Cremorne, near Sydney, New South Wales, Australia, assignor to Automatic Totalisators Limited, Meadowbank, near Sydney, New South Wales, Australia, a company of New South Wales, Australia Application September 9, 1948, Serial No. 48,502
In Australia September 24, 1947

2 Claims. (Cl. 235—61)

This invention relates to odds computing means for use with race totalizators; that is, means whereby the ratio of investment on all the competitors in an event to the investment on a single competitor in that event, are continuously determined (throughout a run of transactions in respect of the particular event, irrespective of "odds" fluctuations in the run) and manifested in a manner enabling the odds prevailing at any instant of a transaction run, to be relayed for visual display on a "barometer," screen, or other indicating device.

The object of the invention is the provision of odds computing means of the kind indicated, which, by comparison with prior devices for the same purpose, are extremely compact, simple and inexpensive in regard to manufacture, installation and maintenance.

Race totalizators of the kind with which the present invention is usable, incorporate a plurality of ticket issuers which record the transactions effected in respect of every competitor in an event by actuation of adding units which sum the transactions for each competitior. At any instant in a transaction run, the ratio of transactions totalled by all of the adding units to the total given by an adding unit for a particular competitor represent the instantly prevailing odds for the particular competitor.

For the purpose of odds computation, the grand total given by the whole group of adding units is manifested as the total movement of an angularly or linearly movable arm (or other member) from a zero or datum point, and the competitor total given by any single adding unit is similarly manifested as the movement of a second movable member from the same datum point. Thus the ratio of the distance (angular or linear) between the first movable member and datum on the one hand, to the distance between the second movable member and datum on the other hand, is directly proportional to the odds prevailing for the competitor to which the second movable member is peculiar.

The invention may be briefly summarised as comprising a resistor element, a first contact movable upon the resistor element in proportion to a grand total count, means for applying a constant voltage to the first contact, a second contact movable upon the resistor element in proportion to a competitor count, and indicator devices operable in consonance with the amount of the resistor element in circuit between the first and second contacts.

A preferred embodiment of the invention is illustrated in the drawings herewith, wherein Figure 1 is a diagrammatic representation of the preferred embodiment of the invention, and Figure 2 is a perspective view, partly schematic, of the mechanism for operating the odds ratio indicator.

Referring now to the drawings in detail, and to Figure 1 in particular, the movable contacts 4 and 5 are able to travel along a resistor element 6 in respective accordance with the grand total of transactions registered by a grand total unit indicated at 7 and a total of individual competitor transaction registered by a competitor unit indicated at 8. A suitable constant voltage is impressed across the resistor element 6 (through contact 4) as indicated at 9.

The second or output movable contact 5 is connected to the grid of any suitable thermionic tube 10, a common triode, for example, or other high impedance input amplifier or relay. The anode of tube 10 has a constant high tension voltage impressed thereon and is circuited with a moving coil relay or similar meter device 11 the movable element of which has associated therewith an arm 12 carrying a soft iron contact piece 13. This soft iron contact piece 13 is adapted to bridge a "transmitter" potentiometer 14 and a contact strip 15, said transmitter potentiometer being circuited with a similar "receiver" potentiometer 16 to constitute a common Wheatstone bridge circuit.

A moving coil relay 17 is connected between the contact strip 15 and a movable contact arm 18 associated with the receiver potentiometer 16.

The coil of the moving coil relay 17 carries a switch arm 19 for the purpose of closing either pair of two pairs of contacts 20 and 21, respectively circuited with two driving solenoids 22 and 23 which through pawls 29 and 30, respectively, actuate ratchet gears 27 and 28, respectively, on the shaft 24 to rotate the movable contact arm 18 in either direction with respect to its associated potentiometer 16. "Odds" ratio numbers for projection on to a display screen or through a suitable sight window (not shown) are marked on a disc carried on a shaft 24 directly operable by the movement of arm 18.

Referring again to the transmitter section, the soft iron contact piece 13 is clear of both the transmitter potentiometer 14 and the contact strip 15 until a coil 25 is energised by closure of a distributor 26 whereupon contact piece 13, being of soft iron, is attracted downwardly (as shown in the drawing) and so bridges the circuit, at that particular point, constituted by potentiometer 14 and contact strip 15.

It will be appreciated that while a bridge circuit has been described as existing between potentiometers 14 and 16 in order to effect a visual display of "odds" at shaft 24 by virtue of the electrical unbalance of said bridge circuit, the actual indicator device for the display of said "odds" may be constituted by the movable element of the meter device 11 which is caused to move by the fluctuations in plate current across thermionic device 10. To this end the arm 12 operated by the movable element of meter device 11 may have suitable indicator means associated therewith for display through a sight window or the like. In other words, because the angular disposition of arm 12 is a function of the odds (computed by the two contacts 4 and 5— in terms of the amount of resistor 6 in circuit between them) it may be used as a pointer associated with any suitable scale from which the odds may be read directly.

In operation the movable contact 4 is caused to travel along the resistor element 6 by operation of grand total unit 7, while the movable contact 5 is caused to travel along the said resistor element in like manner by the competitor unit 8. As the totals of transactions received by units 7 and 8 increase, the movable contact arms 4 and 5 move upwards on the resistor element 6 which causes varying voltages to be impressed upon the grid of triode 10 which in turn varies the plate current of said tube.

It will be seen that the resistor length effectively in circuit at any given instant is directly proportional to the instantly prevailing odds ratio and it follows that the grid voltage in the triode, being in direct connection with the resistor element, is likewise directly proportional to the prevailing odds.

This variation in plate current then causes operation of meter 11 to move the arm 12 together with its associated soft iron contact piece 13, across the transmitter potentiometer 14 and contact strip 15. As hereinbefore described, the contact piece 13 is clear of the potentiometer 14 and strip 15 until such time as the operation of distributor 26 closes circuit and the coil 25 is energised thereby causing the soft iron contact piece 13 to be drawn downwardly and so bridge the circuit at that point.

Immediately contact is effected by contact piece 13 bridging the integers 14 and 15, the movable contact arm 18 associated with the receiver potentiometer 16 is connected in circuit through polarised or moving coil relay 17. It will thus be seen that when the two potentiometers 14 and 16 are out of electrical balance, 16 always being slave to 14, either one or other of contacts 20 and 21 are made by contact 19, associated with the relay 17, resulting in energisation of either of solenoids 22 or 23 which through the pawls 29 and 30 and ratchet gears 27 and 28, respectively, actuate the movable contact arm 18 with respect to its associated potentiometer 16. At the same time, an odds ratio scale motivated by the shaft 24 registers for projection on to a display screen or the like or through a suitable sight window.

I claim:

1. An odds computing device for race track totalizators including a grand total unit, a competitor unit, and a distributor, a rheostat having two movable arms, a source of constant electromotive force connected between one end of said rheostat and one movable arm thereof, a connection from the grand total unit to the latter arm for moving the latter in proportion to the grand total count, a connection from the competitor unit to the second rheostat arm for moving the latter in proportion to the competitor count, a circuit for operating an indicator according to the voltage drop between said arms comprising conductors from the end of said rheostat and the second rheostat arm, a moving coil relay having an oscillatory arm swingable in a plane at right angles to its plane of oscillation, said relay having its oscillatory coil connected in said circuit, a bridge circuit comprising a transmitter potentiometer including a resistance underlying said oscillatory arm, and a receiver potentiometer having an arm, a contact strip also underlying the arm of the moving coil relay and connected by a conductor to the arm of the receiver potentiometer, a solenoid adjacent the path of movement of the arm of the moving coil relay and adapted to pull same into engagement with both the resistance of the transmitter potentiometer and the contact strip, and a local circuit for energizing said solenoid including a switch operated by the distributor.

2. An odds computing device for race track totalizators including a grand total unit, a competitor unit, and a distributor, a rheostat having two movable arms, a source of constant electromotive force connected between one end of said rheostat and one movable arm thereof, a connection from the grand total unit to the latter arm for moving the latter in proportion to the grand total count, a connection from the competitor unit to the second rheostat arm for moving the latter in proportion to the competitor count, a circuit for operating an indicator according to the voltage drop between said arms comprising conductors from the end of the rheostat and the second rheostat arm, a moving coil relay having an oscillatory arm swingable in a plane at right angles to its plane of oscillation, said relay having its oscillatory coil in said circuit, a bridge circuit comprising a transmitter potentiometer including a resistance underlying said osillatory arm, a second source of electromotive force connected across said resistance, and a receiver potentiometer, an indicator shaft having mounted thereon the arm of the receiver potentiometer, a contact strip also underlying the arms of the moving coil relay, a second moving coil relay having a movable and two fixed contacts, a local circuit for said second relay from the contact strip to the arm of the receiver potentiometer, a solenoid adjacent the path of movement of the arms of the first moving coil relay and adapted to pull same into engagement with both the resistance of the transmitter potentiometer and the contact strip, a local circuit for energizing said solenoid including a switch operated by the distributor, means including a pair of links connected to the arm of the receiver potentiometer and indicator for selectively moving same in opposite directions, solenoids for operating said links, and a load circuit for said second moving coil relay including the second source of electromotive force, said solenoids and the fixed contacts of the relay.

EDWARD THOMAS BOTH.

REFERENCES CITED

The following references are of record in the file of this patent:

UNITED STATES PATENTS

| Number | Name | Date |
| --- | --- | --- |
| 1,345,700 | Routin | July 6, 1920 |
| 2,108,146 | Simpson | Feb. 15, 1938 |
| 2,217,639 | Luhrs | Oct. 8, 1940 |